United States Patent
Sobel et al.

(10) Patent No.: US 8,108,935 B1
(45) Date of Patent: Jan. 31, 2012

(54) METHODS AND SYSTEMS FOR PROTECTING ACTIVE COPIES OF DATA

(75) Inventors: William E. Sobel, Jamul, CA (US);
Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 832 days.

(21) Appl. No.: 12/059,665

(22) Filed: Mar. 31, 2008

(51) Int. Cl.
*G06F 7/04* (2006.01)
*G06F 17/30* (2006.01)
*H04N 7/16* (2011.01)

(52) U.S. Cl. ............ 726/26; 726/1; 726/2; 726/3; 726/4; 726/5; 726/22; 726/23; 726/24; 726/25; 726/27; 707/828; 707/716; 707/694

(58) Field of Classification Search ...................... 726/26
See application file for complete search history.

(56) References Cited

U.S. PATENT DOCUMENTS

| | | | |
|---|---|---|---|
| 6,272,631 B1* | 8/2001 | Thomlinson et al. | 713/155 |
| 7,673,324 B2* | 3/2010 | Tirosh et al. | 726/1 |
| 7,870,606 B2* | 1/2011 | Peretti | 726/21 |
| 2002/0174349 A1* | 11/2002 | Wolff et al. | 713/188 |
| 2003/0159070 A1* | 8/2003 | Mayer et al. | 713/201 |
| 2004/0250033 A1* | 12/2004 | Prahlad et al. | 711/162 |
| 2008/0229428 A1* | 9/2008 | Camiel | 726/27 |
| 2009/0019515 A1* | 1/2009 | Excoffier et al. | 726/1 |

* cited by examiner

*Primary Examiner* — Nathan Flynn
*Assistant Examiner* — Bryan Wright
(74) *Attorney, Agent, or Firm* — Advantedge Law Group

(57) ABSTRACT

A computer-implemented method for protecting active copies of data may include detecting an attempt to access an active copy of original data, identifying an access rule associated with the original data, and determining whether to allow access to the active copy by applying the access rule to the attempt to access the active copy. The computer-implemented method may also include associating the access rule with a file-system path of the active copy. The access rule may be a file-system rule associated with a file-system path of the original data. Various other computer-implemented methods, systems, and computer-readable media for protecting active copies of data are also disclosed.

20 Claims, 6 Drawing Sheets

METHODS AND SYSTEMS FOR PROTECTING ACTIVE COPIES OF DATA

BACKGROUND

The WINDOWS volume snapshot service was first included in MICROSOFT's WINDOWS XP operating system. In WINDOWS XP, the volume snapshot service creates non-persistent (i.e., temporary) snapshots that MICROSOFT refers to as volume shadow copies. Volume shadow copies may facilitate creating backups by providing a point-in-time representation of a volume. Volume shadow copies may also alleviate problems associated with file locking.

In WINDOWS 2003 SERVER, MICROSOFT introduced a feature referred to as Shadow Copies for Shared Folders. Shadow Copies for Shared Folders may create periodic point-in-time copies (i.e., snapshots or shadow copies) of files on a shared network resource. WINDOWS VISTA includes a similar feature called Previous Versions. Previous Versions may create periodic snapshots that store copies of files on local volumes.

The shadow copies created by WINDOWS 2003 SERVER and WINDOWS VISTA may be particularly vulnerable to malicious access because they are persistent, rather than temporary, snapshots. Furthermore, the Shadow Copies for Shared Folders service in WINDOWS 2003 SERVER and the Previous Versions service in WINDOWS VISTA may be enabled by default. Thus, many computers running WINDOWS VISTA may store persistent shadow copies of the computers' volumes that may be directly accessible by any code running on the computers. Similarly, many networks with servers running WINDOWS 2003 SERVER may store persistent shadow copies of network resources that may be accessible to many network devices.

Traditional data protection systems may protect original data but may not protect the persistent shadow copies of the original data. Attackers who are unable to access the original data, may target the shadow copies. Thus, users may have a false sense of security because sensitive information in the original data may be protected, but the same sensitive information may be exposed and easily accessible through a snapshot.

SUMMARY

Embodiments of the instant disclosure protect active copies of data, such as shadow copies and other persistent snapshots, from attacks. In some embodiments, a data-protection module may detect an attempt to access an active copy of original data. The data-protection module may identify an access rule associated with the original data and may determine whether to allow access to the active copy by applying the access rule to the attempt to access the active copy. In some embodiments, the access rule may be a file-system rule associated with a file-system path of the original data. In other embodiments, the access rule may be a behavior-blocking rule, such as a data-loss-prevention (DLP) rule.

According to various embodiments, the original data may comprise a volume, and the active copy may comprise a persistent snapshot of the volume. The persistent snapshot may be a shadow copy of the volume, and the shadow copy may be generated by a backup utility of an operating system. In some embodiments, the active copy may be stored on a computer that stores the original data, an online storage device, and/or an online network device.

In some embodiments, the data-protection module may protect the active copy of the original data by denying access to the active copy if the access rule prohibits access to the original data. The data-protection module may permit access to the active copy if the access rule permits access to the original data. In other words, the data-protection module may apply the same rules to the active copy that it applies to the original data.

In other embodiments, the data-protection module may apply special rules to active copies that are not applied to the original data. For example, the data-protection module may detect an attempt to access first data, determine that the first data is an active copy of original data, and determine whether to allow access to the active copy by applying an active-copy-data-protection rule to the attempt to access the active copy. The active-copy-data-protection rule may prevent untrusted and/or unknown applications from accessing the active copy. The active-copy-data-protection rule may also or alternatively prevent unexpected access attempts from accessing the active copy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
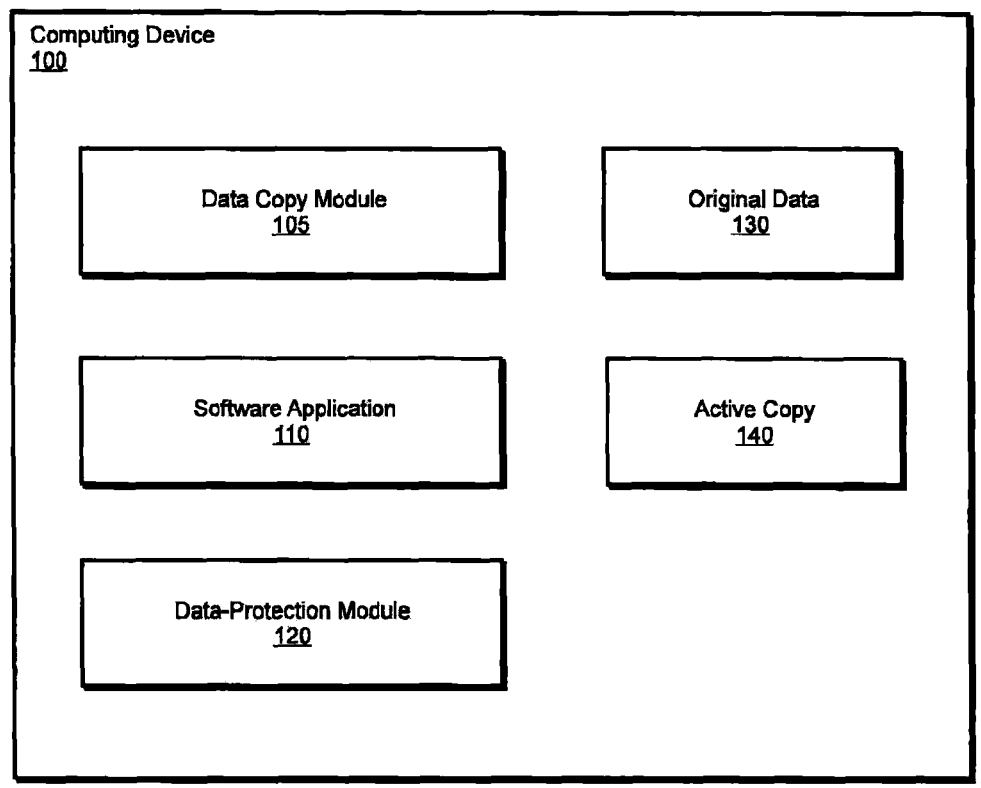
FIG. 1 is a block diagram of an exemplary computing device according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to protecting active copies of data from malicious attacks. Some embodiments include methods for detecting an attempt to access an active copy of data, identifying an access rule associated with the original data, and determining whether to allow access to the active copy by applying the access rule to the attempt to access the active copy. Other embodiments may include methods for detecting an attempt to access first data, determining that the first data is an active copy of the original data, and determining whether to allow access to the active copy by applying an active-copy-data-protection rule to the attempt to access the active copy. As discussed in greater detail below, the systems and methods disclosed herein may provide various other features and advantages.

FIG. 1 shows a computing device 100 with a data copy module 105, a software application 110, and a data-protection module 120. Data copy module 105 may be a snapshot utility, an operating system snapshot service (e.g., WINDOWS VOLUME SNAPSHOT SERVICE), or any other application capable of creating copies of data. Data copy module 105 may create an active copy 140 of original data 130. Original data 130 may be a volume (i.e., a storage area with a single file system), one or more folders, one or more files, or any other data structure or storage mechanism.

The term active copy, as used herein, may refer to copies of original data that are accessible in the same manner that the original data is accessible. In contrast to traditional backups, which may be stored on offline storage devices, active copies may be stored on the same computing device or network device that stores the original data. In some embodiments, active copies may also be copies of online storage devices (e.g. storage devices that may not contain the original data but may be directly accessible in the same manner that the original data is accessible) or online network devices (e.g., network devices that may not contain the original data but may be directly accessible in the same manner that the original data is accessible.) In some embodiments, an active copy may be a persistent snapshot (e.g., a shadow copy) of the original data.

In some embodiments, data copy module 105 may automatically create a snapshot of a file or folder (i.e., an active copy) of a specified volume at a specific point in time. The active copies may be incremental snapshots stored on local volumes, and the active copies may be available for use in restoring data. A user may also use data copy module 105 to manually create an active copy. In other embodiments, active copies may be created manually when a backup utility is used. As previously noted, traditional security mechanisms may not protect active copies from malicious access. In contrast, data-protection module 120 may be programmed to protect active copies.

Figure 2:
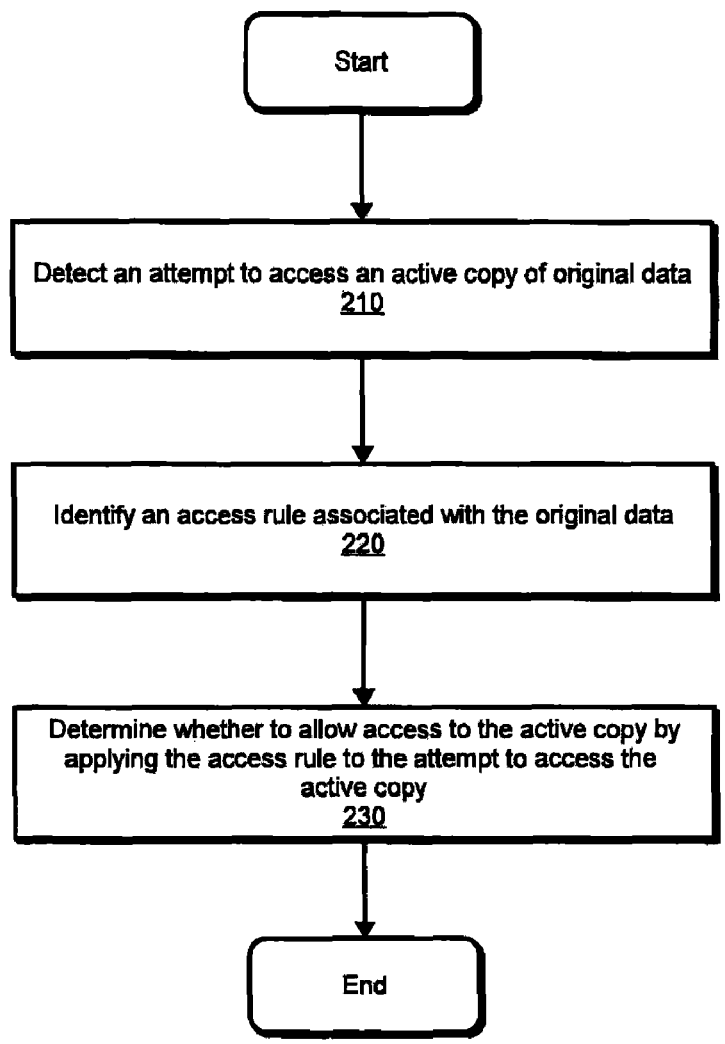
FIG. 2 is a flow diagram of an exemplary method for protecting active copies of data according to certain embodiments.

FIG. 2 illustrates a method 200 for protecting active copies of data. A data-protection module, such as data-protection module 120, may detect an attempt to access an active copy of original data (step 210). Detecting an attempt to access an active copy of original data may comprise detecting an attempt to copy, write to, overwrite, delete, read, or otherwise access the original data. The data-protection module may detect the attempt to access the active copy by monitoring all attempts to access the active copy. The data-protection module may also specifically watch for attempts to access potentially sensitive information. Potentially sensitive information may be a folder, a file, or any other data that may contain financial information (e.g., bank account information, credit card information, etc.), personal information (e.g., social security numbers, birthdays, passwords), or any other user information that a user may want to keep others from accessing.

The data-protection module may determine which data in the active copy is potentially sensitive by determining which files or other information in the original data may be protected by access rules. For example, the data-protection module may identify an access rule associated with the original data (step 220). An access rule may be any rule or permission setting that defines or controls access to data. An access rule may apply to a file, a folder, a volume, or any other data structure or storage mechanism.

The data-protection module may determine whether to allow access to the active copy by applying the access rule to the attempt to access the active copy (step 230). In other words, the data-protection module may apply the same rules to data in active copies that it applies to the corresponding original data. For example, if an access rule prevents a media player from accessing documents located in C:\DocumentsAndSettings\User\MyDocuments\Financial Documents, the data-protection module may associate the access rule with each active copy of the Financial Documents folder (there may be numerous active copies that represent the original data at various points in time). Thus, if the media player attempts to access data found at \\Snapshots \HarddiskVolumeAccessCopy20\DocumentsAndSettings\ User\MyDocuments\FinancialDocuments, the data-protection module may prevent the access attempt.

As noted, the access rule for the original data may be associated with a file-system path of each active copy. The access rule may be associated with the file-system path of the active copy in a database, a table, or through any other suitable association means. In other embodiments, in response to an attempt to access an active copy of data, the data-protection module may search for access rules associated with the original data. If the data-protection module finds an access rule associated with the original data, the data-protection module may apply the access rule to the active copy.

In some embodiments, an access rule may be a behavior blocking rule. A data-protection module may implement behavior blocking by detecting and preventing unauthorized transmission of information from active copies of data. Behavior blocking technologies may include Data Loss Prevention (DLP), Information Leak Detection and Prevention (ILDP), Content Monitoring and Filtering (CMF), and/or any other behavior blocking technologies.

Behavior blocking technologies may be implemented as host-based behavior blocking systems that run on end-user computing systems. Host-based behavior blocking systems may monitor and control access to physical storage devices and other data storage. Some host-based systems may provide application controls to block attempted transmissions of confidential information. Various other behavior blocking systems may also be used to protect active copies.

Figure 3:
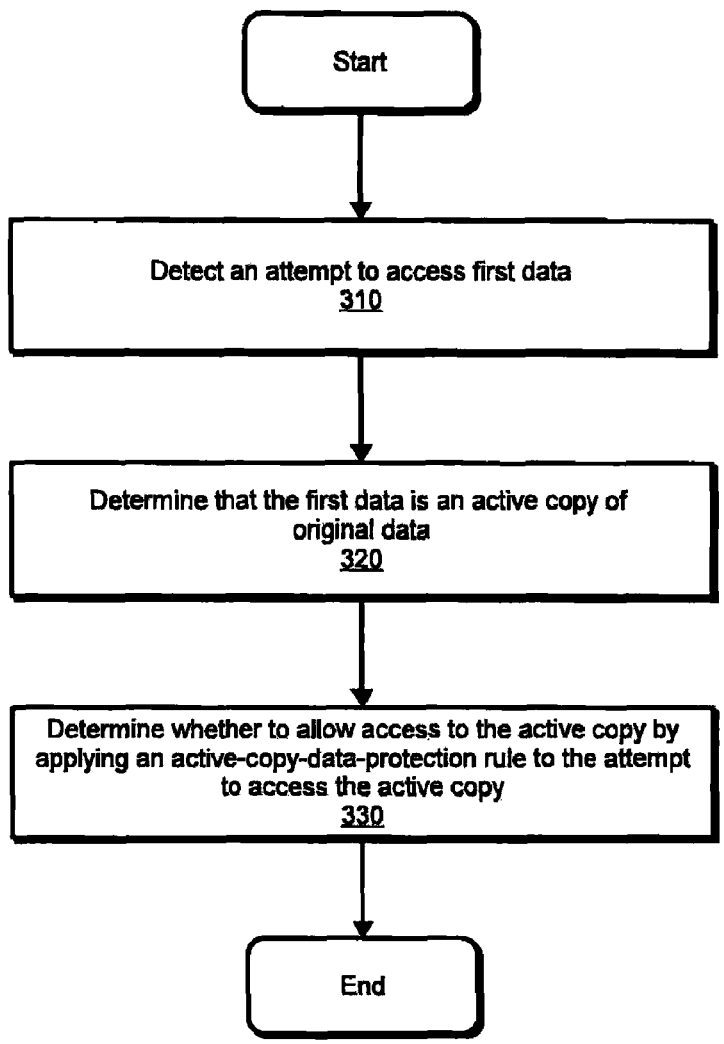
FIG. 3 is a flow diagram of another exemplary method for protecting active copies of data according to certain embodiments.

FIG. 3 is a flow diagram of a method 300 for protecting active copies of data by applying special rules to the active copies. A data-protection module may detect an attempt to access first data (step 310). The first data may be any file, folder, volume, or other data structure or data storage mechanism. The data-protection module may then determine that the first data is an active copy of the original data (step 320). The data-protection module may determine that the first data is an active copy of the original data by checking a file path of the active copy. For example, active copies may be stored in a particular location in a volume, and the data-protection module may determine that any attempt to access that particular location is an attempt to access an active copy of data.

After determining that the first data is an active copy, the data-protection module may determine whether to allow access to the active copy by applying an active-copy-data-protection rule to the attempt to access the active copy (step 330). An active-copy-data-protection rule may be any rule particular to active copies, rather than the original data.

Because few applications may need access to active copies, in some embodiments, a data-protection module may be more protective of active copies than original data. Also active copies may require special protection because they may include sensitive information that may have been deleted (and therefore no longer needs protection) in the original data.

An active-copy-data-protection rule may prevent unknown applications from accessing active copies of data. For example, if an application attempts to access an active copy, a data-protection module may check a list or database to determine whether the application is designated as being known (i.e., whether the application is whitelisted). If the application is not whitelisted (i.e., the application is unknown), the data-protection module may prevent the application from accessing the active copy. If the application is on the list (i.e., the application is known), the data-protection module may permit the application to access the active copy. In some embodiments, only data restoration applications or backup applications may be permitted to access active copies. In other embodiments, various other types of applications may be permitted to access active copies.

In various embodiments, an active-copy-data-protection rule may prevent untrusted applications from accessing active copies of data. For example, a data-protection module may implement the rule by blocking applications listed in an untrusted list or database (i.e., blacklisted applications) from accessing active copies. In other words, if an application is on a blacklist, a data-protection module may prevent the application from accessing active copies.

According to at least one embodiment, the active-copy-data-protection rule may prevent unexpected access attempts to active copies. An unexpected access attempt may be any attempt from an application that is not expected to access active copies. For example, only backup applications or restoration applications may be expected to access active copies. In other embodiments, a data-protection module may track access to active copies and may prevent an application that has not recently (or ever) accessed active copies from accessing the active copies.

An active-copy-data-protection rule may require a data-protection module to query a user before allowing access to the active copy. For example, the data-protection module may ask the user whether to allow an application to access the active copy. If the user indicates that access to the active copy is allowed, the data-protection module may permit the application to access the active copy. If the user indicates that access to the active copy is not allowed, the data-protection module may prevent access to the active copy.

Figure 4:
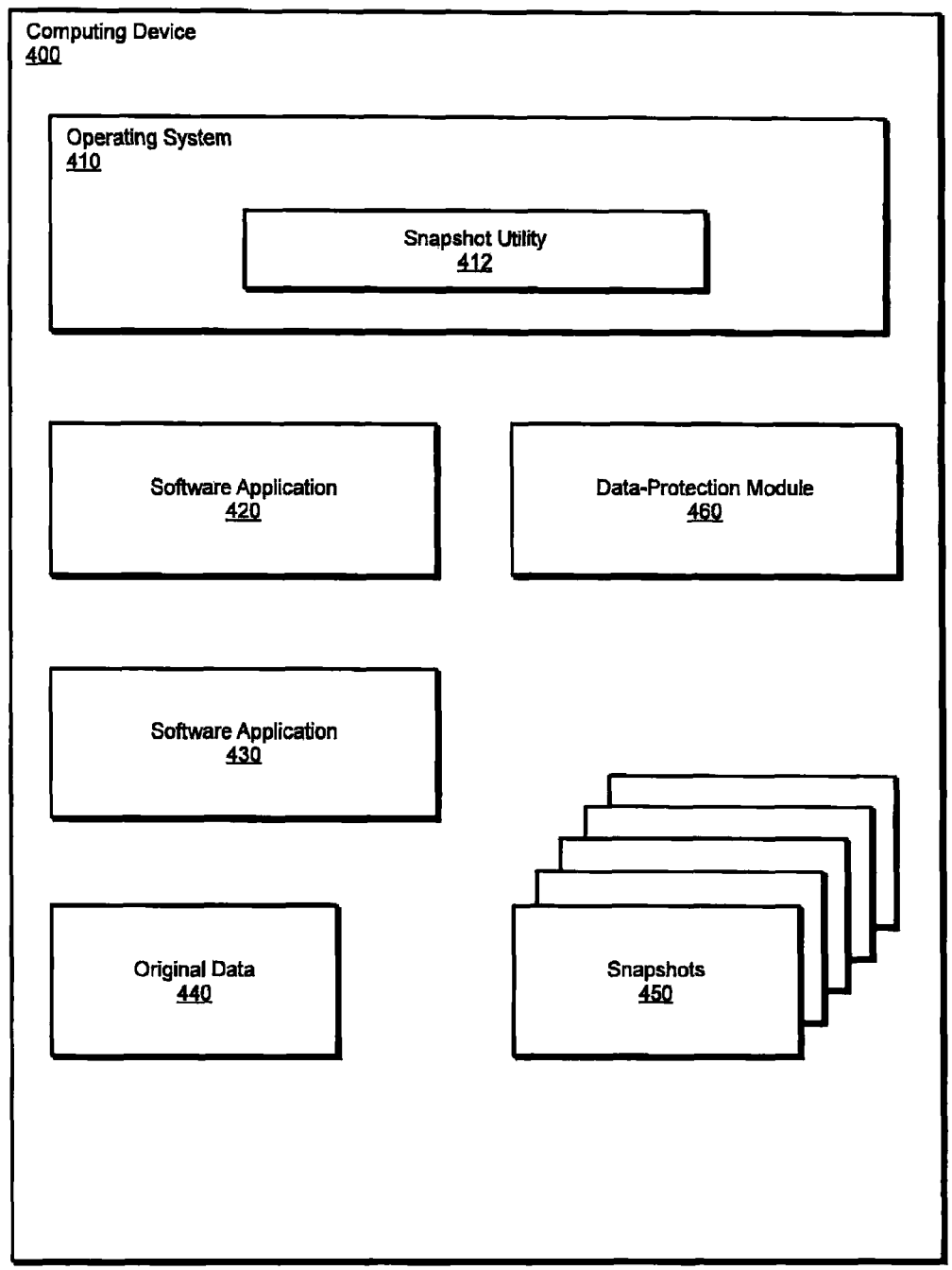
FIG. 4 is a block diagram of an exemplary computing device with a data-protection module according to certain embodiments.

FIG. 4 illustrates a computing device 400 with an operating system 410 and software applications 420 and 430. Operating system 410 may be a WINDOWS operating system (e.g., WINDOWS VISTA, WINDOWS SERVER 2003, etc.), a MAC operating system (e.g., MAC OS X LEOPARD), or any other suitable operating system. Operating system 410 may include a snapshot utility 412. Snapshot utility 412 may be any application, module, or other computer-executable code capable of creating copies of data. For example, snapshot utility 412 may be a WINDOWS VOLUME SNAPSHOT SERVICE application, APPLE's TIME MACHINE rollback feature, or any other snapshot or data copying utility.

Snapshot utility 412 may create snapshots 450 of original data 440. Snapshot utility 412 may periodically (e.g., daily, weekly, monthly, etc.) make incremental point-in-time copies of original data 440, and snapshots 450 may comprise these point-in-time copies of original data 440. In one example, software application 420 may be a data restoration utility and software application 430 may be a video editing application.

Data-protection module 460 may apply an access rule that only allows data backup and restoration applications to access snapshots 450. Thus, when software application 420 attempts to access snapshots 450, data-protection module 460 may permit access, but when software application 430 attempts to access snapshots 450, data-protection module 460 may prohibit access.

Embodiments of the instant disclosure may provide one or more advantages over prior data security applications and systems. Various embodiments may protect active copies of data from tampering and other malicious attacks. As discussed and shown, data-protection modules may apply data protection rules for original data to active copies of the original data. In some embodiments, data-protection modules may also or alternatively apply special rules to active copies to provide additional protection for sensitive information within the active copies. These features and technologies may prevent attackers from exploiting shadow copies.

Figure 5:
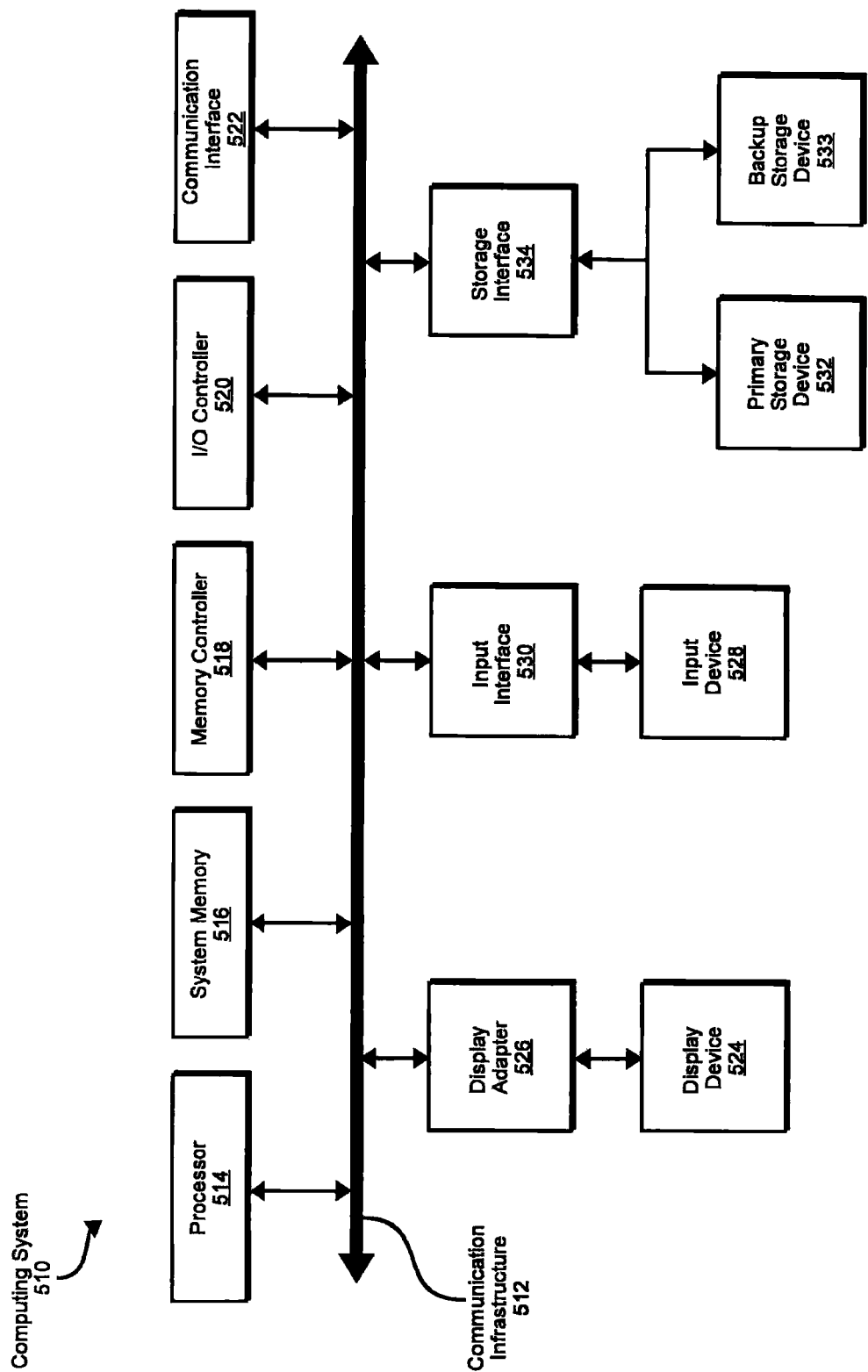
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the receiving, analyzing, detecting, determining, modifying, providing, and including steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as receiving, analyzing, detecting, determining, modifying, providing, and including.

I/O controller 520 generally represents any type or form of module capable of coordinating and/or controlling the input and output functions of a computing device. For example, in certain embodiments I/O controller may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the receiving, analyzing, detecting, determining, modifying, providing, and including steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the receiving, analyzing, detecting, determining, modifying, providing, and including steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the receiving, analyzing, detecting, determining, modifying, providing, and including steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, the exemplary file systems disclosed herein may be stored on primary storage device 532, while the exemplary file-system backups disclosed herein may be stored on backup storage device 533. Storage devices 532 and 533 may also be used, for example, to perform and/or be a means for performing, either alone or in combination with other elements, one or more of the receiving, analyzing, detecting, determining, modifying, providing, and including steps disclosed herein. Storage devices 532 and 533 may also be used to perform and/or be a means for performing other steps and features set forth in the instant disclosure.

Many other devices or subsystems may be connected to computing system 610. Conversely, all of the components and devices illustrated in FIG. 5 need not be present to practice the embodiments descried and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a software application (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the software application may be loaded into computing system 510. All or a portion of the software application stored on the computer-readable medium may then be stored in system memory 516 and/or various portions of storage devices 532 and 533. When executed by processor 514, a software application loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
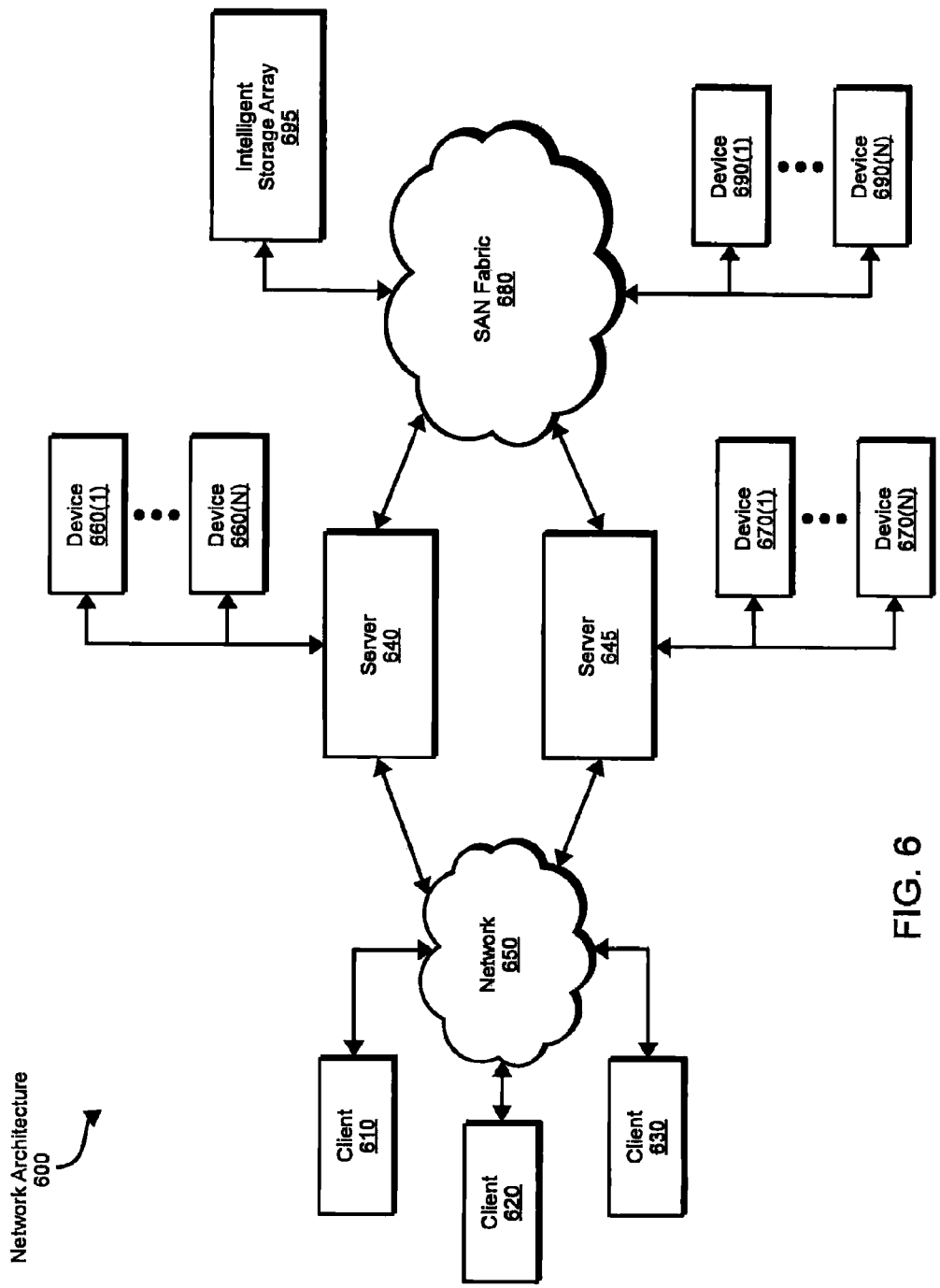
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and intelligent storage array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a software application and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a software application, stored in server 640, run by server 645, and distributed to client systems 610, 620, and 630 over network 650. Accordingly, network architecture 600 may perform and/or be a means for performing, either alone or in combination with other elements, one or more of the receiving, analyzing, detecting, determining, modifying, providing, and including steps disclosed herein.

As detailed above, computing system 510 and/or one or more of components of network architecture 600 may perform and/or be means for performing, either alone or in combination with other elements, one or more steps of the exemplary computer-implemented methods described and/or illustrated herein. According to certain embodiments, a computer-implemented method may comprise analyzing source code of a software application, detecting that the source code is programmed to access a computer resource, and determining a security implication of the source code being programmed to access the computer resource.

A computer-implemented method may comprise detecting an attempt to access an active copy of original data, identifying an access rule associated with the original data, determining whether to allow access to the active copy by applying the access rule to the attempt to access the active copy. In some embodiments, the method may further comprise associating the access rule with the file-system path of the active copy. The access rule may be a file-system rule associated with the file-system path of the original data.

In some embodiments, the access rule may be a behavior-blocking rule, such as a data-loss-prevention rule. In various embodiments, the original data may be a volume, and the active copy may be a persistent snapshot of the volume. The persistent snapshot may be a shadow copy of the volume. The shadow copy may be generated by a backup utility of an operating system.

The active copy may be stored on at least one of a computer that stores original data, an online storage device, or an online network device. In some embodiments, the method may further comprise permitting access to the active copy if the access rule permits access to the original data, and deny access to the active copy if the access rule prohibits access to the original data.

In various embodiments, the access rule may require querying a user before allowing access to the active copy. In such embodiments, determining whether to allow access to the active copy may comprise asking the user whether to allow access to the active copy and receiving a response from the user. Then, it may be determined whether to allow access to the active copy based on the response from the user.

According to certain embodiments, a computer-implemented method may comprise detecting an attempt to access first data, determining that the first data is an active copy of original data, and determining whether to allow access to the active copy by applying an active-copy-data-protection rule to the attempt to access the active copy.

In some embodiments, the original data may be a volume and the active copy may be a persistent snapshot of the volume. In other embodiments, the persistent snapshot may be a shadow copy of the volume. The shadow copy may be generated by a backup utility of an operating system. In at least one embodiment, the active copy may reside on the computer that stores the original data, an online storage device, or an online network device.

In some embodiments, the active-copy-data-protection rule may prevent untrusted applications from accessing active copies of data. In other embodiments, the active-copy-data-protection rule may prevent unexpected access attempts from accessing active copies of data. In other embodiments, the active-copy-data-protect rule may prevent unknown applications from accessing active copies of data.

In some embodiments the active-copy-data-protection rule may require querying a user before allowing access to the active copy. Also, determining whether to allow access to the active copies may comprise asking a user whether to allow access to the active copy, receiving a response from the user, and determining whether to allow access to the active copy based on the response from the user.

According to certain embodiments, a computer-readable media may comprise one or more computer executable instructions that, when executed by a computing device may cause the computing device to detect an attempt to access an active copy of original data, identify an access rule associated with the original data, and determine whether to allow access to the active copy by applying the access rule to the attempt to access the active copy. In some embodiments, the computer-readable media may comprise computer-executable instructions that are operable to associate the access rule of a file-system path of the active copy. The access rule may be a file-system rule associated with a file-system path of the original data. In other embodiments, the access rule may be a behavior-blocking rule.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method, the computer-implemented method comprising:
   detecting an attempt to access an active copy of original data;
   identifying an access rule associated with the original data, wherein
      the active copy of the original data comprises a persistent snapshot of the original data being generated by a backup utility of an operating system, and
      the access rule comprises a file-system rule associated with the file-system path of the original data;
   determining whether to allow access to the active copy by applying the access rule to the attempt to access the active copy of the original data;
   associating the access rule with a file-system path of the active copy;
   permitting access to the active copy of the original data if the access rule permits.

2. The computer-implemented method of claim 1, wherein:
   identifying the access rule comprises searching for and locating the access rule.

3. The computer-implemented method of claim 1, wherein:
the access rule is a behavior-blocking rule.

4. The computer-implemented method of claim 3, wherein:
the behavior-blocking rule is a data-loss-prevention rule.

5. The computer-implemented method of claim 1, wherein:
the original data is a volume;
the active copy is a persistent snapshot of the volume.

6. The computer-implemented method of claim 5, wherein:
the persistent snapshot is a shadow copy of the volume, the shadow copy being generated by a backup utility of an operating system.

7. The computer-implemented method of claim 1, wherein:
the active copy resides on a least one of:
  a computer that stores the original data;
  an online storage device;
  an online network device.

8. The computer-implemented method of claim 1, further comprising:
denying access to the active copy if the access rule prohibits access to the original data.

9. The computer-implemented method of claim 1, wherein:
the access rule requires querying a user before allowing access to the active copy;
determining whether to allow access to the active copy comprises:
  asking the user whether to allow access to the active copy;
  receiving a response from the user;
  determining whether to allow access to the active copy based on the response from the user.

10. A computer-implemented method comprising:
detecting an attempt to access first data;
determining that the first data is an active copy of original data;
determining whether to allow access to the active copy by applying an active-copy-data-protection rule to the attempt to access the active copy in response to the determining that the first data is an active copy of original data;
permitting access to the active copy if the active-copy-data-protection rule permits, wherein:
  the active copy of the original data comprises a persistent snapshot of the original data being generated by a backup utility of an operating system,
  the active-copy-data-protection rule applies to a plurality of active copies of original data including the active copy, and
  the active-copy-data-protection rule is different than an access rule that applies to a plurality of items of original data corresponding to the active copies.

11. The computer-implemented method of claim 10, wherein:
the original data is a volume;
the active copy is a persistent snapshot of the volume.

12. The computer-implemented method of claim 11, wherein:
the persistent snapshot is a shadow copy of the volume, the shadow copy being generated by a backup utility of an operating system.

13. The computer-implemented method of claim 10, wherein:
the active copy is stored on a least one of:
  a computer that stores the original data;
  an online storage device;
  an online network device.

14. The computer-implemented method of claim 10, wherein:
the active-copy-data-protection rule prevents untrusted applications from accessing active copies of data.

15. The computer-implemented method of claim 10, wherein:
the active-copy-data-protection rule prevents unexpected access attempts from accessing active copies of data.

16. The computer-implemented method of claim 10, wherein:
the active-copy-data-protection rule prevents unknown applications from accessing active copies of data.

17. The computer-implemented method of claim 10, wherein:
the active-copy-data-protection rule requires querying a user before allowing access to the active copy;
determining whether to allow access to the active copy comprises:
  asking the user whether to allow access to the active copy;
  receiving a response from the user;
  determining whether to allow access to the active copy based on the response from the user.

18. A non-transitory computer-readable medium comprising one or more computer-executable instructions that, when executed by a computing device, cause the computing device to:
detect an attempt to access an active copy of original data;
identify an access rule associated with the original data, wherein
  the active copy of the original data comprises a persistent snapshot of the original data being generated by a backup utility of an operating system, and
  the access rule comprises a file-system rule associated with the file-system path of the original data;
determine whether to allow access to the active copy by applying the access rule to the attempt to access the active copy of the original data;
associate the access rule with a file-system path of the active copy;
permit access to the active copy of the original data if the access rule permits.

19. The computer-readable medium of claim 18, wherein:
identifying the access rule comprises searching for and locating the access rule.

20. The computer-readable medium of claim 18, wherein:
the access rule is a behavior-blocking rule.

* * * * *